United States Patent
Korhonen et al.

(10) Patent No.: US 10,674,516 B2
(45) Date of Patent: Jun. 2, 2020

(54) LOAD CONTROL SYSTEM FOR DEVICE TO DEVICE DISCOVERY SIGNAL TRANSMISSIONS

(71) Applicant: Nokia Technologies Oy, Espoo (FI)

(72) Inventors: Juha Sakari Korhonen, Espoo (FI); Zexian Li, Espoo (FI); Zhi Zhang, Beijing (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/113,913

(22) PCT Filed: Jan. 30, 2014

(86) PCT No.: PCT/CN2014/071851
§ 371 (c)(1),
(2) Date: Jul. 25, 2016

(87) PCT Pub. No.: WO2015/113310
PCT Pub. Date: Aug. 6, 2015

(65) Prior Publication Data
US 2016/0353448 A1 Dec. 1, 2016

(51) Int. Cl.
*H04W 72/04* (2009.01)
*H04W 8/00* (2009.01)

(52) U.S. Cl.
CPC ....... *H04W 72/0486* (2013.01); *H04W 8/005* (2013.01)

(58) Field of Classification Search
CPC .............................................. H04W 72/0486
See application file for complete search history.

(56) References Cited

U.S. PATENT DOCUMENTS

| 5,729,542 A * | 3/1998 | Dupont ............. H04W 74/0875 370/346 |
| 7,738,376 B2 | 6/2010 | Balakrishnan et al. |
| 2003/0223368 A1 | 12/2003 | Allen, Jr. et al. |

(Continued)

FOREIGN PATENT DOCUMENTS

| CN | 101252511 A | 8/2008 |
| CN | 102238730 A | 11/2011 |

(Continued)

OTHER PUBLICATIONS

International Search Report and Written Opinion received for corresponding Patent Cooperation Treaty Application No. PCT/IB2012/052043, dated Mar. 20, 2013, 16 pages.

(Continued)

*Primary Examiner* — John D Blanton
(74) *Attorney, Agent, or Firm* — Squire Patton Boggs (US) LLP

(57) ABSTRACT

Various communication systems may benefit from load control. For example, systems that employ device-to-device discovery signal transmissions may benefit from such load control. A method can include determining a first classification of a user equipment according to desired or allowed transmission probability. The method can also include configuring a transmission probability based on the first classification. The method can further include operating the user equipment based on the transmission probability.

15 Claims, 8 Drawing Sheets

(56) References Cited

U.S. PATENT DOCUMENTS

| | | | | |
|---|---|---|---|---|
| 2012/0275397 | A1* | 11/2012 | Hsieh | H04L 1/1812 370/329 |
| 2015/0327231 | A1* | 11/2015 | Wang | H04J 11/00 370/329 |
| 2016/0044724 | A1* | 2/2016 | Seo | H04W 74/0833 370/329 |

FOREIGN PATENT DOCUMENTS

| | | |
|---|---|---|
| CN | 102695211 A | 9/2012 |
| WO | 1997/019525 A1 | 5/1997 |
| WO | 2001/089257 A1 | 11/2001 |
| WO | 2008/069406 A2 | 6/2008 |

OTHER PUBLICATIONS

Fujitsu RRM for D2D Communication 3GPP TSG-RAN1, #75, R1-135142, Nov. 15, 2013.

LG Electronics Resource Allocation and UE Behavior for D2D Discovery 3GPP TSG RAN WG1 Meeting #74bis, R1-134802, Oct. 11, 2013.

Gerla et al., "Closed Loop Stability Controls for S-Aloha Satellite Communications", SIGCOMM '77 Proceedings of the fifth symposium on Data communications, Sep. 27-29, 1977, 10 pages.

Rivero-Angeles et al., "Random Access Control Mechanism Using Adaptive Traffic Load in ALOHA and CSMA Strategies for EDGE", IEEE Transactions on Vehicular Technology, vol. 54, No. 3, May, 2005, pp. 1160-1186.

"Study on LTE Device to Device Proximity Services", 3GPP TSG RAN Meeting #58, RP-122009, Agenda: 13.2, Qualcomm Incorporated, Jun. 12, 2012, 06 pages.

"3rd Generation Partnership Project; Technical Specification Group RAN; Study on LTE Device to Device Proximity services;(Release 12)", 3GPP TR 36.843, V0.1.0, Apr. 2013, pp. 01-08.

Partial Supplementary European Search Report received for corresponding European Patent Application No. 14881213.4, dated Sep. 15, 2017, 14 pages.

Andreev et al., "Calculation of Transmission Probability in Heterogeneous Ad Hoc Networks", Baltic Congress on Future Internet Communications (BCFIC RIGA), Feb. 16-18, 2011, pp. 75-82.

Thanos et al., "Network-Assisted Discovery for Device-to-Device Communications", IEEE Globecom Workshops (GC Wkshps), Dec. 9-13, 2013, pp. 660-664.

Extended European Search Report issued in corresponding European Patent Application No. 14881213.4 dated Dec. 19, 2017.

Chinese Office Action issued in corresponding Chinese Patent Application No. 201480076940.7 dated Nov. 5, 2018.

European Office Action issued in corresponding European Patent Application No. 14 881 213.4-1215 dated Mar. 14, 2019.

Chinese Office Action issued in corresponding Chinese Patent Application No. 2014800769407 dated Apr. 19, 2019.

Third Office Action issued in corresponding Chinese Patent Application No. 201480076940.7, dated Jul. 3, 2019, with partial English translation.

European Office Action issued in corresponding European Patent Application No. 14 881 213.4-1215 dated Jan. 23, 2020.

\* cited by examiner

LOAD CONTROL SYSTEM FOR DEVICE TO DEVICE DISCOVERY SIGNAL TRANSMISSIONS

RELATED APPLICATION

This application was originally filed as Patent Cooperation Treaty Application No. PCT/CN2014/071851 filed Jan. 30, 2014.

BACKGROUND

Field

Various communication systems may benefit from load control. For example, systems that employ device-to-device (D2D) discovery signal transmissions may benefit from such load control.

Description of the Related Art

Device to device proximity detection is discussed in third generation partnership project (3GPP) documents including 3GPP RAN RP-122009 and technical report (TR) 36.843, which are each incorporated herein by reference in their entirety. Proximity detection can be based on a plurality of user equipment (UEs) transmitting and detecting discovery signals. In a so-called general use case, UEs are under the coverage of a cellular network. The network is assumed to assign an overall discovery resource pool. From this pool, UEs either are given or select in a contention based manner, a resource from the time and frequency multiplexed resources. A contention based approach, known as Type 1 discovery in TR 36.843, may be useful in order to support device-to-device (D2D) discovery for idle mode UEs. The discovery signals are conventionally assumed to be broadcasted. Therefore, there are no negative or positive acknowledgements from the receiving UEs. Accordingly, conventionally there is no way a transmitting device can know whether its discovery signal has collided with another device's signal. Therefore, a simple load controlling system where back-off time is applied after collision is not available.

SUMMARY

According to certain embodiments, a method can include determining a first classification of a user equipment according to desired or allowed transmission probability. The method can also include configuring a transmission probability based on the first classification. The method can further include operating the user equipment based on the transmission probability.

In certain embodiments, a method can include receiving, at a network element, a plurality of reports from user equipment. The reports can indicate a relative number of three user types. The three types can be that the user equipment operates at a minimum level regardless of a mean probability of transmission probabilities of a plurality of user equipment, that the user equipment adjusts transmission to the mean probability, and that the user equipment operates at a maximum level regardless the mean probability. The method can also include adjusting network resources based on the relative number.

An apparatus, according to certain embodiments, can include at least one processor and at least one memory including computer program code. The at least one memory and the computer program code can be configured to, with the at least one processor, cause the apparatus at least to determine a first classification of a user equipment according to desired or allowed transmission probability. The at least one memory and the computer program code can also be configured to, with the at least one processor, cause the apparatus at least to configure a transmission probability based on the first classification. The at least one memory and the computer program code can further be configured to, with the at least one processor, cause the apparatus at least to operate the user equipment based on the transmission probability.

An apparatus, according to certain embodiments, can include at least one processor and at least one memory including computer program code. The at least one memory and the computer program code can be configured to, with the at least one processor, cause the apparatus at least to receive, at a network element, a plurality of reports from user equipment. The reports can indicate a relative number of three user types. The three types can be that the user equipment operates at a minimum level regardless of a mean probability of transmission probabilities of a plurality of user equipment, that the user equipment adjusts transmission to the mean probability, and that the user equipment operates at a maximum level regardless the mean probability. The at least one memory and the computer program code can also be configured to, with the at least one processor, cause the apparatus at least to adjust network resources based on the relative number.

According to certain embodiments, an apparatus can include means for determining a first classification of a user equipment according to desired or allowed transmission probability. The apparatus can also include means for configuring a transmission probability based on the first classification. The apparatus can further include means for operating the user equipment based on the transmission probability.

In certain embodiments, an apparatus can include means for receiving, at a network element, a plurality of reports from user equipment. The reports can indicate a relative number of three user types. The three types can be that the user equipment operates at a minimum level regardless of a mean probability of transmission probabilities of a plurality of user equipment, that the user equipment adjusts transmission to the mean probability, and that the user equipment operates at a maximum level regardless the mean probability. The apparatus can also include means for adjusting network resources based on the relative number.

A non-transitory computer-readable medium can, according to certain embodiments, be encoded with instructions that, when executed in hardware, perform a process. The process can include any of the above-described methods.

A computer program product can, in certain embodiments, encode instructions for performing a process. The process can include any of the above-described methods.

BRIEF DESCRIPTION OF THE DRAWINGS

For proper understanding of the invention, reference should be made to the accompanying drawings, wherein.

DETAILED DESCRIPTION

Figure 1A:
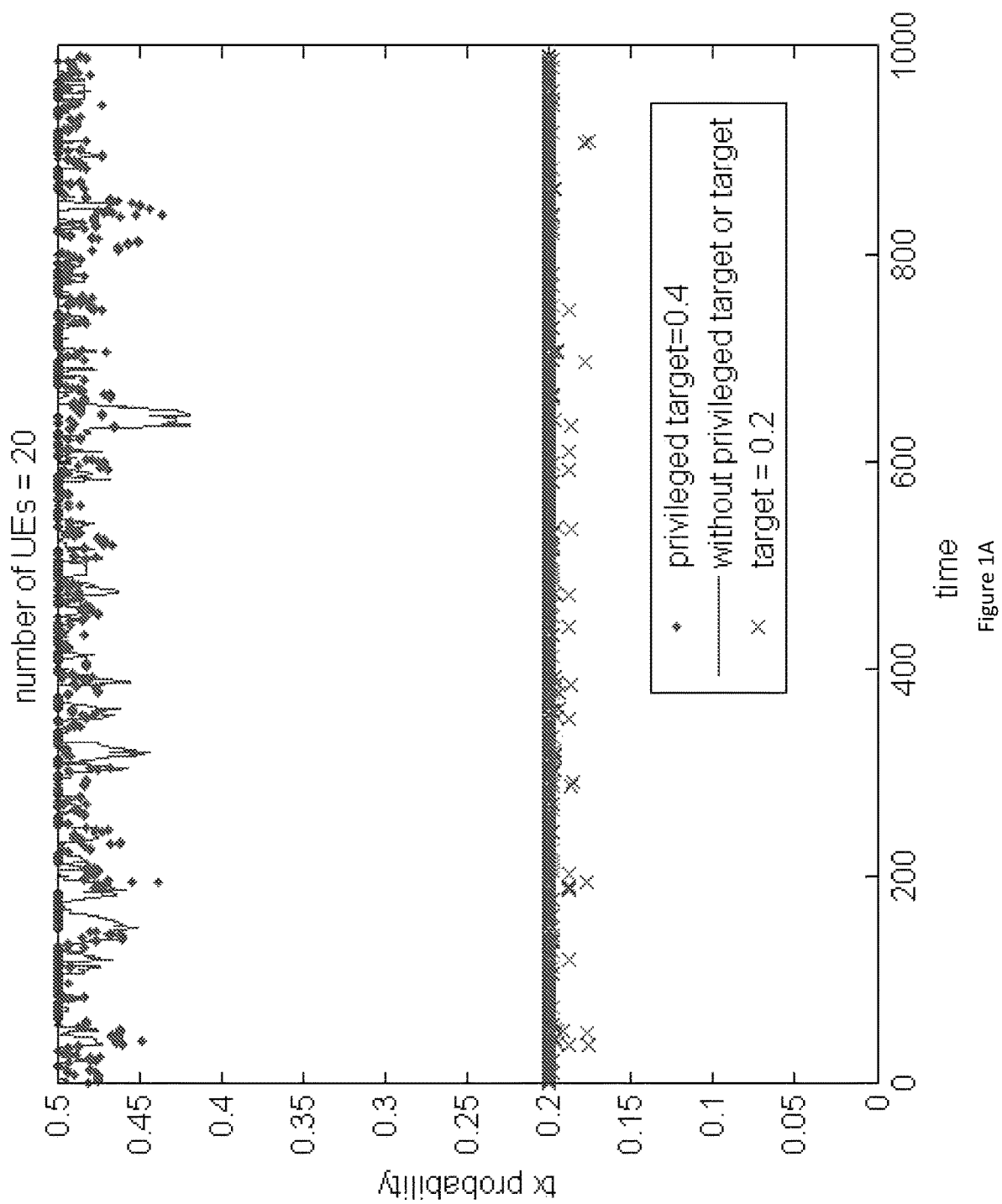
FIG. 1A illustrates transmission probabilities over time with 20 UEs.

Slotted Aloha is a particularly simple contention based system and may be used for Type 1 discovery. For broadcast type of transmission, a simplest implementation may define each UE maintaining a transmission (TX) probability value such that, for each subframe with discovery signal resources, a UE chooses to transmit according to its TX probability. In a typical condition in which the number of UEs is large compared with the number of resources, the ideal load may correspond to the average of one discovery signal per a resource. In this case, the throughput can be $1/e \approx 0.37$. With smaller load, the transmissions may be unnecessarily delayed while, if the load goes beyond the optimal value, throughput may be lost due to too many collisions. What may be needed is a load controlling system for slotted Aloha for maintaining the maximum capacity when the number of UEs participating to the discovery signal transmissions is varying with time.

Besides maximizing the throughput, other features of a desired load control system may include fairness and distributed implementation that would allow adapting transmission probabilities according to local variations in the load. The local variations may appear when some regions are more densely populated by UEs than others or UEs in a region are more active than in other regions. The overall discovery resources may be typically allocated on a per cell basis. If the density or activity of UEs is varying within a cell, the resources may be underutilized in some regions while they may be overloaded in other regions even with optimal mean utilization rate of the resources in the cell as a whole. Distributed load control can adapt resource use locally, for instance, by reducing the transmission probability of discovery signals in regions of high load and allowing higher transmission probabilities in regions of low load. Distributed implementation may be useful, for example, for D2D applications which can remove unnecessary network overhead. Furthermore, the design may need to take into account that some UEs may desire to operate with exceptionally low TX probability or could be allowed to use higher TX probability than the average. For instance, some UEs may limit the frequency of transmissions for saving battery although the system's load and fairness would allow larger frequency. On the other hand, network could allow exceptionally high resource utilization rate for some UEs. Certain embodiments can address these and/or other needs in a communication system.

Load control of slotted Aloha has been studied. A typical system in such studies has been uplink (UL) from devices to an access point or base station. In this case, the receiving node can estimate the load and control it to the optimal level with feedback signaling broadcasted in downlink (DL) from an access point or base station to devices. Examples of such studies can be found in "Random access control mechanism Using Adaptive Traffic Load in ALOHA and CSMA Strategies for EDGE" by Mario E. Rivero-Ángeles, Domingo Lara-Rodriguez, and Felipe A. Cruz-Pérez, IEEE TRANSACTIONS ON VEHICULAR TECHNOLOGY, VOL. 54, NO. 3, MAY 2005, and references cited therein, which together with the references cited therein, is hereby incorporated herein by reference in its entirety.

Such centralized control may not apply well to the present situation of controlling the load in a broadcast system, for at least two reasons. First, there may be no central node that would be able to observe the load in the system. The evolved node B (eNB) may not be able to estimate reliably the load of the discovery signals, because these signals are not meant for eNB but for other UEs to detect. Additionally, due to the limited TX power of the discovery signal, the eNB might not able to detect the discovery signal from far way UEs at all. Therefore, the centralized control may require UEs reporting their experienced load to the central node, which would impose a signaling burden for both the UEs and the network.

Second, centralized control may become very cumbersome if adaptation to local variations in the load is desired. In such a case, the central node may need to know the location of the reporting nodes and feedback may need to be targeted locally.

Because of the above reasons, a distributed load control system may be selected rather than a centralized load control system. In a distributed system UEs would adapt their transmission probability according to the load they detect. Distributed control systems have been studied in Mario Gerla, Leonard Kleinrock, "Closed loop stability controls for S-Aloha satellite communications", Proceeding SIGCOMM '77 Proceedings of the $5^{th}$ symposium on Data communications, pages 2.10~2.19, which is hereby incorporated herein by reference in its entirety.

According to that and similar studies, the transmitting nodes can detect deviation from the optimum load by observing the number of idle resources, number of colliding transmissions or throughput, or different combinations of these. An estimated deviation can be used for tuning the transmission probability to the direction that contributes to moving the load closer to the optimum value. In order to maintain fairness of resource use, a part of the conventional algorithm is that the nodes broadcast their transmission probabilities.

The nodes can then observe the mean transmission probability of other nodes and can tend to tune their transmission probability towards the probability. If only load estimate were taken into account for tuning the probabilities, UEs would end up having very uneven TX probabilities. Some UEs could use very much of the resources while others would use very little, but the total load could still be close to the optimal value. And if the load is close to the optimal, the UEs may be adjusting TX probabilities very slowly, which would lead to the unfair situation persisting for a long time.

When each node takes into account the two error signals, deviation from the optimal load and node's transmission probability deviation from the mean transmission probability, the system can converge to a state where resources are utilized equally by different nodes while maintaining maximum throughput.

In certain embodiments such a distributed system with a degree of fairness can be applied for controlling discovery signal transmissions. In particular, certain embodiments can take into account that UEs may have different needs for discovery signal transmission: some UEs may be satisfied with transmitting very seldom or a high resource utilization rate may be allowed for certain users. Users with a high resource utilization rate may include, for example, advertising restaurant owners or shop keepers, or users of particular applications. Such flexibility is not considered in the conventional approaches, but may be beneficial for D2D use cases.

More particularly, in conventional approaches, the aim was merely to give nodes equal shares of the resources. By contrast, certain embodiments provide rules for tuning and broadcasting the TX probability values in such a way that different resource needs of the nodes are taken into account. Furthermore, certain embodiments provide load reports and triggers for load reporting that are compatible with the TX probability tuning system.

Certain embodiments, therefore, have various features. For example, certain embodiments provide classification of UEs into different types according to the desired or allowed TX probability and the relation of that probability to the TX probabilities other UEs are using.

Moreover, certain embodiments provide rules of TX probability adjustments and TX probability signaling for the different types and for changing of UE type. Furthermore, certain embodiments provide an indication of UE type and new load reporting based on UE types. Load detection based on the number of vacant resources, detected discovery signals or collisions is also included in certain embodiments.

As an example, there may be three different types or classifications into which the UEs may be classified. These classifications may provide for improved load control. For convenience, these can be described as type A, type B, and type C. A type A UE can be one that is given a target TX probability value that the UE may tend to maintain even if the target is larger than the mean broadcasted TX probability the UE observes. This can be referred to as a type that operates at a minimum level or target level, although there is no requirement that the target level be strictly a minimum level. Also, the target level can be higher than the observed mean Tx probability from other UEs. In other words, the type A UE may require at least the target level of probability, but may be willing to operate at higher levels of probability as well.

A type B UE can tend to adjust the UE's TX probability towards the observed mean TX probability. This can be referred to as the UE adjusting the UE's transmission to the mean probability.

A type C UE can be satisfied with TX probability even below the observed mean value. This can be referred to as operating at a maximum level, although it is not required that the satisfaction amount be strictly a maximum level. In other words, for type C device, there is no problem for the type C device to transmit with a low level of probability, even one that is lower than the indicated value, but the device may not be willing to transmit with a higher probability than this low level.

Type A or type C UEs can become type B UEs if the following conditions are satisfied. For example, a type A UE can become a type B UE if the load in the system becomes so low that the observed mean TX probability becomes larger than the target probability. Alternatively, or in addition, a type C UE can become a type B UE if the mean observed TX probability becomes smaller than the value the UE is satisfied with. Once the UEs become type B UEs, they can behave like type B UEs, including reporting transmission probability. Nevertheless, if the observed mean probability goes below the target probability, the formerly type A UE can again become a type A UE. Likewise, if the observed mean probability rises above the low value for a former type C UE, it can again become a type C UE.

In certain embodiments, only type B UEs broadcast the UE's own TX probability value. The discovery signal can indicate if the signal is transmitted by type A or C UE. Alternatively, type A and type C UEs may also broadcast TX probability information. In such a case, receiving UEs may not take those TX probability values into account when type B UEs adjust their TX probability.

Thus, the TX probabilities of type B UEs can converge to a common value. Because type A and type C UEs have different probability targets, their probability values do not need to be taken into account by type B UEs.

Besides the target and mean observed TX probability values, UEs can take into account the system load when adjusting TX probabilities. As explained below, the UE may estimate the load from, for example, the number of unused resources. The network can broadcast a target value for the number of unused resources. Alternatively, a value corresponding to the maximum throughput for a, for example, Poisson distributed traffic could be used. Such a distribution may be a sufficient approximation even with a low number of UEs. In the latter case, the target value of the unused resources can be obtained directly from the number of resources.

Alternatively, instead of aiming to the load maximizing the throughput, the system could be configured for targeting to a certain collision probability which may be below the value corresponding to the maximum throughput. As transmission of discovery signals consume more battery power than reception of them and as collisions mean waste of battery power, a rather low collision probability may be favored for saving UE batteries and the target load for type B UEs could be set below the value optimal for the throughput.

There may be alternative ways of defining how UEs of different type (A, B, or C) react when they observe that the load deviates from the optimal value. Here optimal may mean optimal with respect to the throughput or optimal with respect to the battery power consumption or, as may be most typical, some kind of a compromise between these. One way is to define that, irrespective of the UE type, the UE tends to change its TX probability to the direction that contributes to minimizing the deviation of the load from the optimal value. When this tendency is made strong enough compared with the tendency of type A and C UEs to aim towards their target probabilities, serious overload can be avoided even if type A UEs were too numerous for all of them to reach the target TX probability.

The above system can control the short term variations in the load over a time scale where the overall discovery signal resources allocated by network are constant. On a longer time scale, the network can adjust the amount of overall resources, so that UEs can obtain suitable TX probabilities. The network's resource adjustment may be based on UEs reporting on the resource use. The UEs may send periodic reports on the relative number of user types: A, B or C. Each UE can indicate the UE's own type in a discovery signal. Alternatively, the UEs can indicate the mean value of the observed TX-probabilities of the other UEs.

There are a variety of possible triggers for aperiodic reporting. For example, if a type A UE is not able to reach the UE's own target TX probability, aperiodic reporting may be triggered. Such a situation may indicate that too many type A UEs are present and would be producing too much load if they all were transmitting at their target probabilities. Alternatively, the relative number of type C UEs may be very high. Such a situation may indicate that there are excess discovery signal resources. Another possible trigger is that the mean of the observed broadcasted TX probability exceeds or becomes smaller than a reporting threshold. Such a situation can indicate that there are an excess of, or too little resources, respectively.

The above load controlling rules can be collected into the following exemplary formulas for controlling the TX probability P_tx:

If $P\_tx(k+1)=P\_tx(k)+C\_load*(optimal\_load-estimated\_load(k))+C\_p*(max(P\_privileged\_target, mean\_P\_tx(k)))-P\_tx(k));$ if $P\_tx(k+1)>P\_target, P\_tx(k+1)=P\_target;$ UE does not broadcast $P\_tx(k+1)$ if
$P\_privileged\_target>mean(p\_tx)$ or
$P\_tx(k+1)>P\_target;$ and if mean_P_tx is not available (no UE is broadcasting it), mean_P_tx(k) is replaced by P_privileged_target (type A UEs) or by P_target (C UEs) or a predetermined constant (representing a maximum P_tx for a type B UE).

In the above example equations, P_tx(k) is the TX probability for the kth time resource, C_load is a coefficient for adjusting P_tx according to the load, C_p is the coefficient for adjusting P_tx according to the mean observed P_tx, optimal_load is the optimal load for the system that can be, for example, based on assumption of a Poisson traffic or can be a parameter broadcasted by the network, estimated_load is the UE's estimate on the load and can be based on observing the number of vacant resources, throughput, number of collisions or different combinations of these, P_privileged_target is larger than zero if the UE has been given a target P_tx value it can maintain even if that is larger than the mean broadcasted P_tx in the system, mean_P_tx(k) is the mean of the P_tx values that are broadcasted by the other UEs, and P_target is the TX probability with which the UE is satisfied.

The linear dependence of P_tx update on the error signals, as shown above, is just used as a simple example. Other kinds of dependence are also permitted.

The functioning of these rules was checked with simulations that were done with the following parameter values: number of frequency resources N_resources=10; C_load=0.01; C_p=0.05; and optimal_load−estimated_load (10=number_of_vacant_resources(k)−N_resources/e, where number_of_vacant_resources is the number of the unused frequency resources.

A fraction of UEs were provided with P_privileged_target and a fraction of UEs was assumed to be satisfied with a low P_tx. The half-duplex assumption was in use. Namely, it was assumed that when the UE transmits it does not record the number of vacant resources or the broadcasted P_tx values. P_tx was limited below 0.5, because a TX probability higher than that does not make sense if UE needs to also detect other UEs. On the other hand, for UEs that do not intend to detect presence of other UEs, even higher values could be meaningful. All UEs were treated as being able to hear each other in the simulation.

As mentioned, there are several methods available for load estimation. Observing the number of vacant resources may be simple as there may necessarily be a sequence part or pilots in the discovery signal. By correlating the received signal with the known pilot or sequence and comparing the correlation result with a threshold, UE can decide if a resource has been vacant. Correlation can separate the discovery signal power from interference. Thus, from the correlation result the UE can see if high power is due interference or from discovery signals. If two UEs send discovery signals in the same resource, this actually makes it easier to detect the resource occupied. If the UEs use the same sequence or pilot, the correlation sums the powers of the UEs. If the UEs used different sequences, their signals would be separated because it is fair to assume that, if more than one sequence or pilot sequence will be specified, they must be orthogonal. For example, if the sequences are orthogonal, they do not produce cross-correlation.

Load estimation based on throughput may be less reliable than observing the number of vacant resources, since a UE cannot easily detect if the signal includes weaker components from other UEs besides the stronger detected one. For example, the UE may not detect that there actually were collisions, although one of the messages was captured. Despite this, the number of detected signals can still provide an indication of the load.

Load estimation based on detection of collisions is also possible. If UE measures large correlation with the sequence or pilots, but still cannot decode the message correctly, it likely means that a collision has happened. Reliability of load estimation can be improved by taking into account more than one of the three estimation methods: number of vacant resources, throughput, and number of collisions.

Figure 1B:
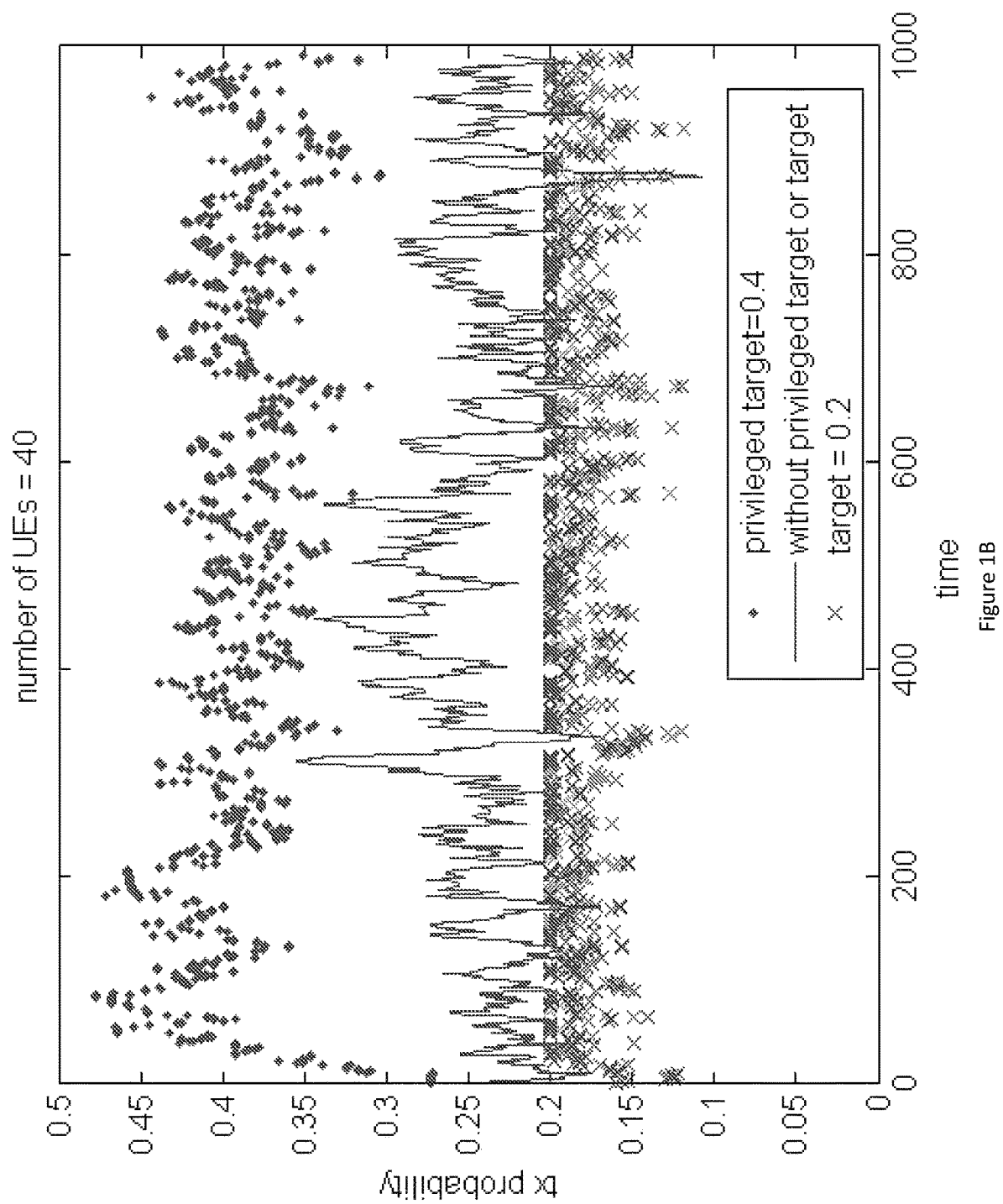
FIG. 1B illustrates transmission probabilities over time with 40 UEs.
Figure 1C:
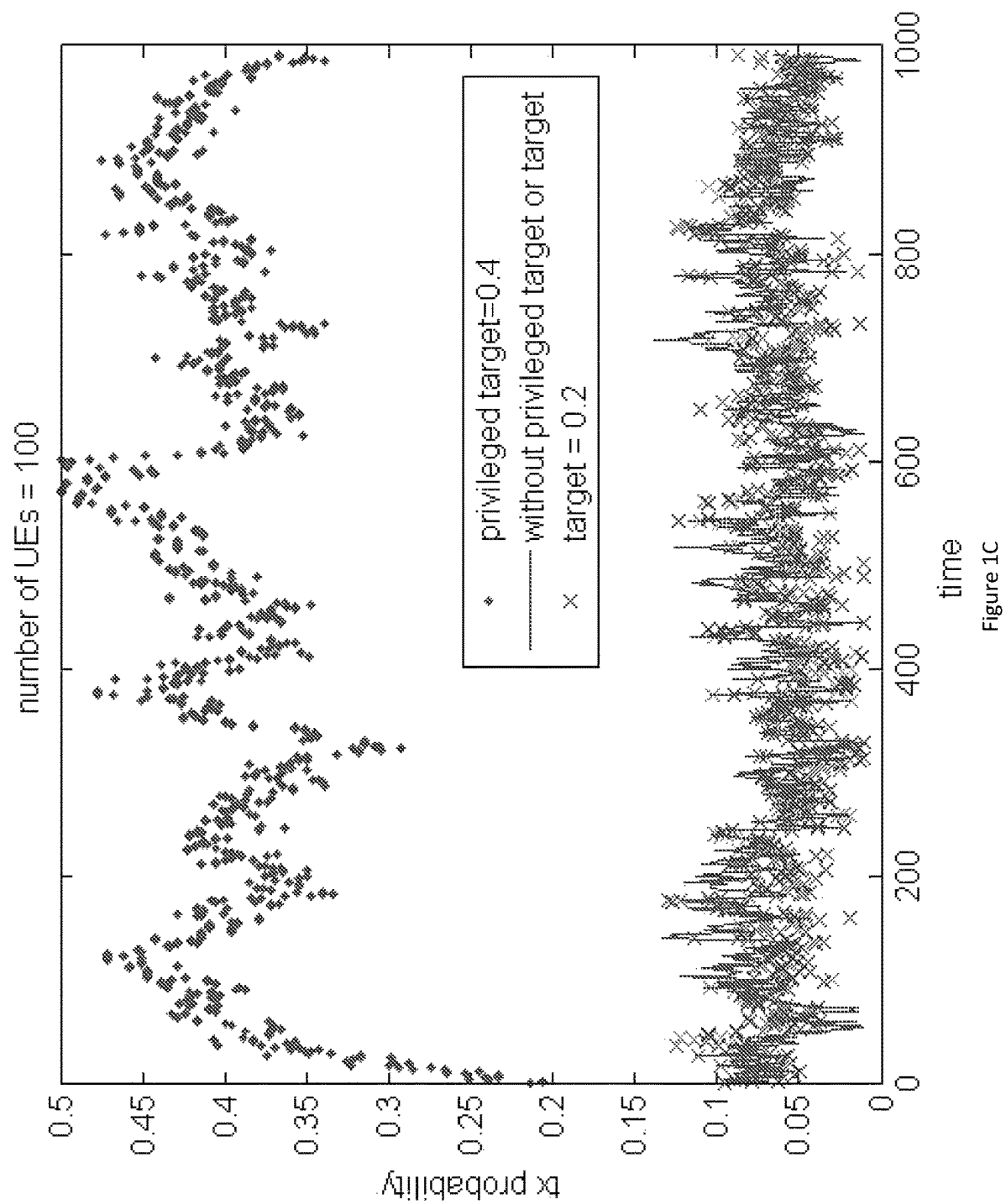
FIG. 1C illustrates transmission probabilities over time with 100 UEs.
Figure 1D:
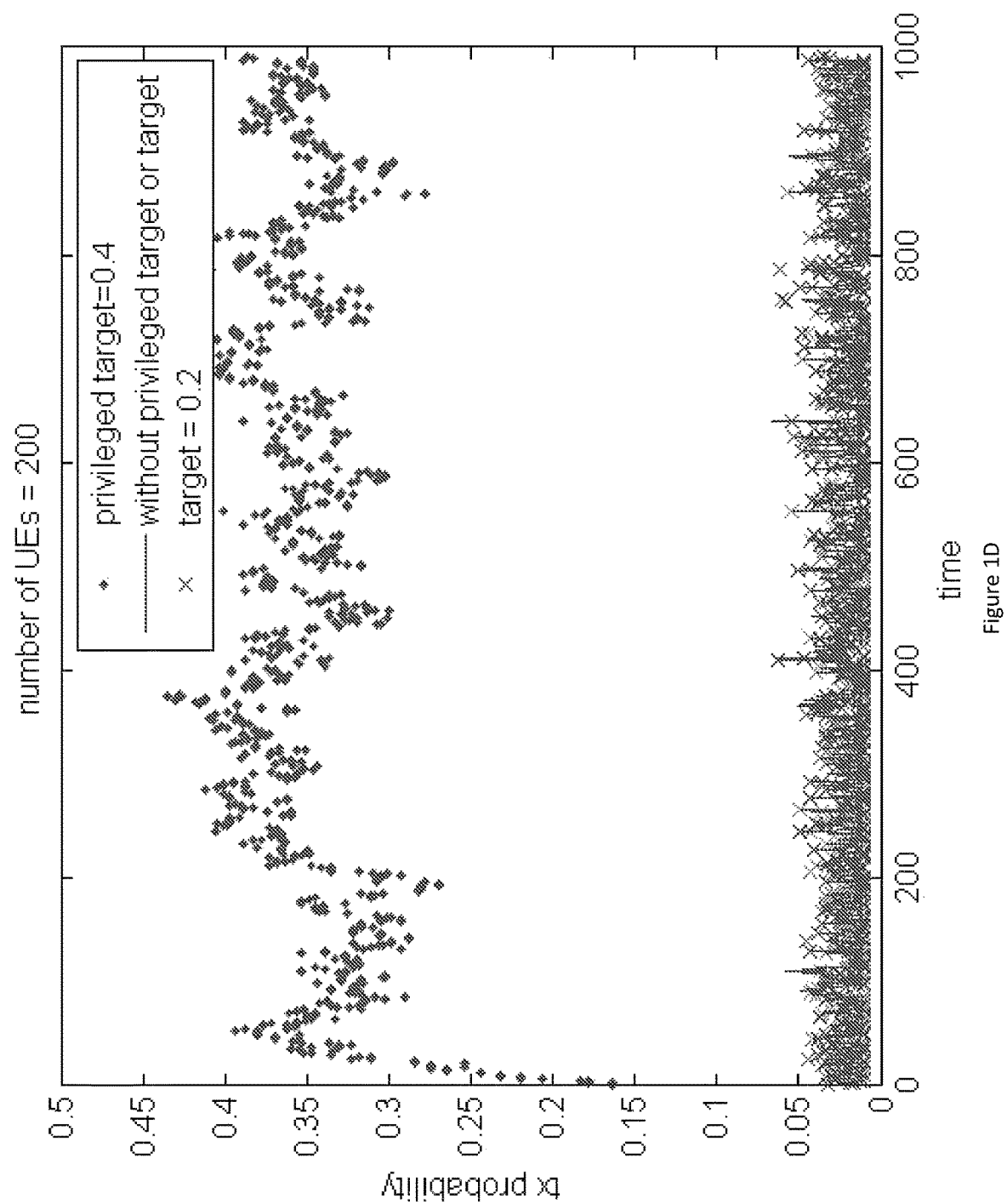
FIG. 1D illustrates transmission probabilities over time with 200 UEs.

FIGS. 1A through 1D demonstrate how the TX probabilities of different type of UEs behave with different total number of UEs. FIG. 1A illustrates transmission probabilities over time with 20 UEs. FIG. 1B illustrates transmission probabilities over time with 40 UEs. FIG. 1C illustrates transmission probabilities over time with 100 UEs. FIG. 1D illustrates transmission probabilities over time with 200 UEs. In each case, 10% of UE's have P_privileged_target=0.4 and 10% of UEs have P_target=0.2. P_tx of three UEs is shown as a function of time: x-marks—P_tx of a UE satisfied with P_tx=0.2 (a type C UE); line—a UE without any P_tx target (a type B UE); points—a UE with P_privileged_target=0.4 (a type A UE).

The number of UEs is the only simulation parameter changing among FIGS. 1A through 1D. Thus, in general FIGS. 1A through 1D illustrate transmission probabilities of different UE types as a function of time for different total number of UEs.

From FIGS. 1A through 1D, it can be seen how different UEs adapt to the changing number of UEs. As shown in FIG. 1A, when the number of UEs is 20, all UEs except those satisfied with low P_tx may behave similarly and can use a very high P_tx.

As shown in FIG. 1B, when the number of UEs is 40, UEs with P_privileged_target or low target P_tx may behave differently compared with type B UEs. On the other hand, as shown in FIG. 1C, when the number of UEs is 100, the UEs with P_privileged_target may still maintain high P_tx but UEs with P_target may no longer be able to reach their target value and may become type B UEs.

As shown in FIG. 1D, when the number of UEs is 200, even the UEs with P_privileged_target may have to lower their P_tx in order the load in the system to remain close to the optimum. UEs without P_privileged_target are allowed to send discovery signals very seldom. This is a kind of error situation where network has allowed too many UEs to have P_privileged_target.

Figure 2:
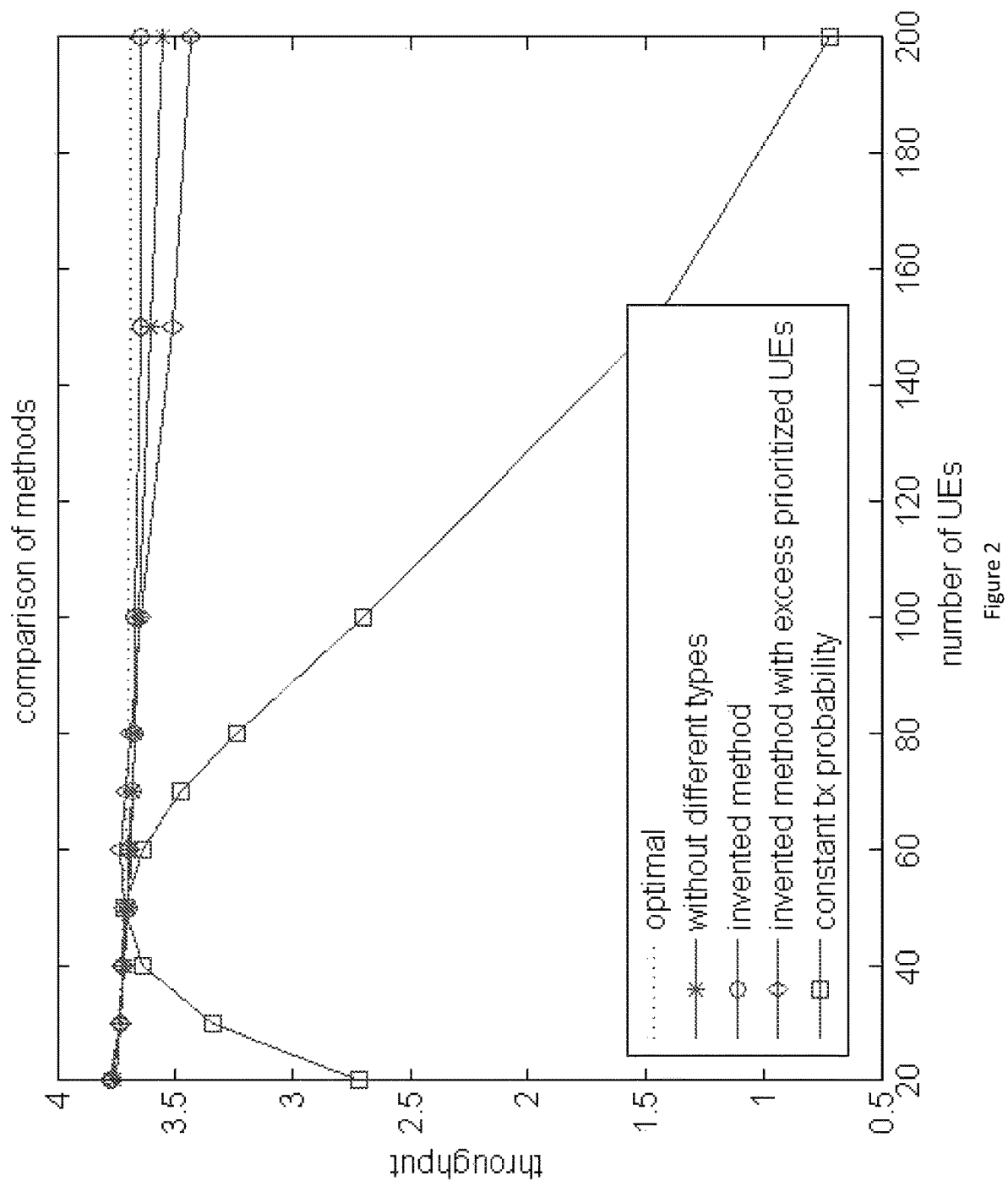
FIG. 2 illustrates throughput as a function of the number of UEs for different systems.

FIG. 2 illustrates throughput as a function of the number of UEs for different systems. Thus, FIG. 2 compares throughput, in terms of a mean number of non-colliding discovery signals, as a number of UEs with five different load adjusting systems. The line with squares illustrates no load control and P_tx adjusted optimal for the number of UEs equal to 50. The dotted curve illustrates all UEs use the P_tx that is optimal for the number of UEs. The curve with stars illustrates a conventional system with no type A or type C UEs in the system. The curve with circles illustrates a system according to certain embodiments, having parameters as in FIGS. 1A through 1D. The curve with diamonds illustrates a system according to certain embodiments, in which the fraction of UEs with P_privileged_target=0.4 is 40%.

As can be seen from FIG. 2, a system according to certain embodiments can approach optimal throughput, while satisfying the needs of different UE types. The curve with diamonds shows that, with the selected C_load and C_p values, serious overload can be avoided even when far too many UEs have been given P_privileged_target.

Implementation of the procedure may include transmitting P_tx as a part of a discovery signal. Four bits may provide sufficient granularity. Two bit sequences (for instance 0000 and 1111) could be reserved for indicating that the discovery signal has been transmitted by type A or C UE (respectively) and no actual P_tx is signaled. This would leave 14 mappings from bit sequences to P_tx of a type B UE. Another alternative is to carry the same information with demodulation reference signal (DMRS) sequence selection.

Figure 3:
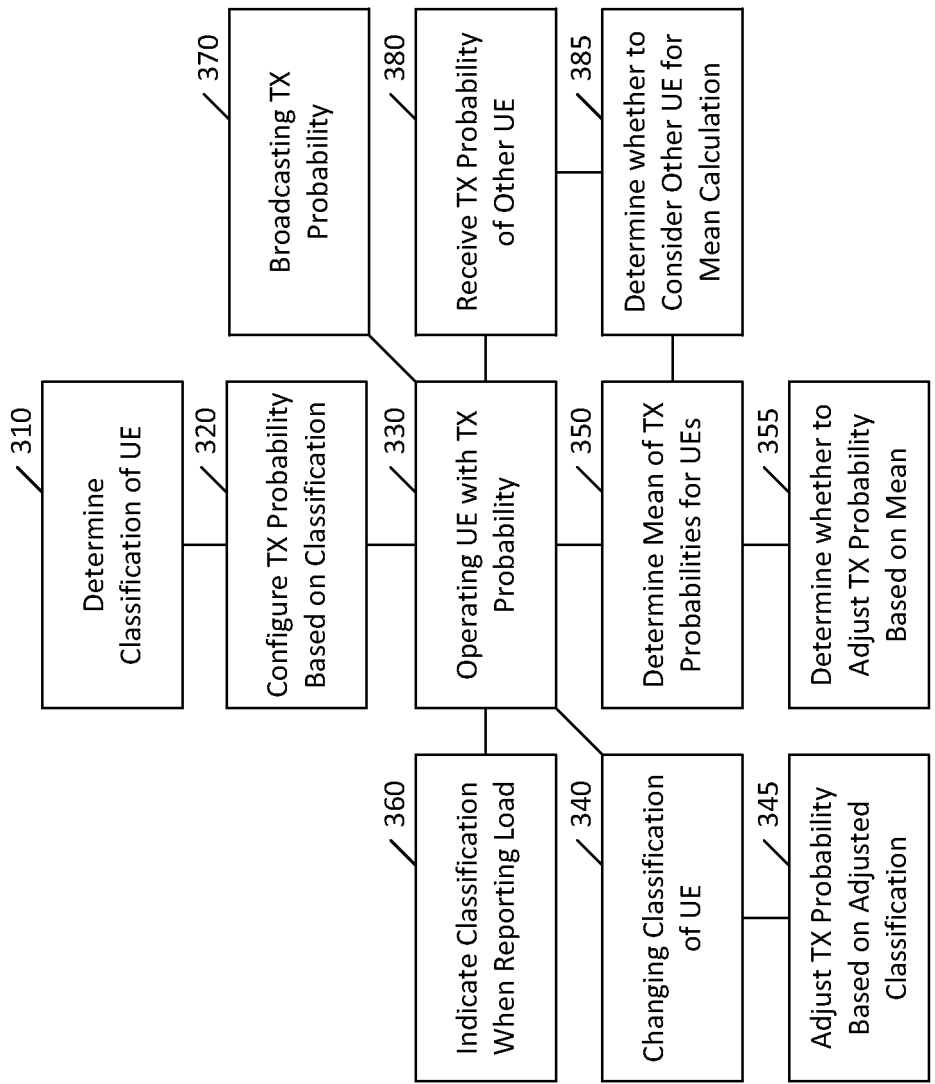
FIG. 3 illustrates a method according to certain embodiments.

FIG. 3 illustrates a method according to certain embodiments. As shown in FIG. 3, a method can include, at 310, determining a first classification of a user equipment according to desired or allowed transmission probability. The first classification can be determined from among exactly two or three types. The three types can be that the user equipment operates at a minimum level regardless of a mean probability of transmission probabilities of a plurality of user equipment, that the user equipment adjusts transmission to the mean probability, and that the user equipment operates at a maximum level regardless the mean probability. Thus, the three types may be type A, type B, and type C. Alternatively, the two types may be A and B or B and C.

The method can also include, at 320, configuring a transmission probability based on the first classification. The method can further include, at 330, operating the user equipment based on the transmission probability.

The method can also include, at 340, changing the first classification. The method can further include, at 345, adjusting the transmission probability based on the changed first classification.

The method can further include, at 350, determining a mean of transmission probabilities of a plurality of user equipment. The method can additionally include, at 355, determining whether to adjust the transmission probability based on the mean, based in part on the first classification.

The method can further include, at 360, indicating the first classification when reporting load.

The method can additionally include, at 370, broadcasting a transmission probability only if the user equipment is set to adjust the transmission probability to the mean probability.

The method can also include, at 380, receiving a transmission probability of other user equipments. The method can further include, at 385, determining whether to take the transmission probability into account when determining a mean transmission probability, based on a classification of the other user equipment.

Figure 4:
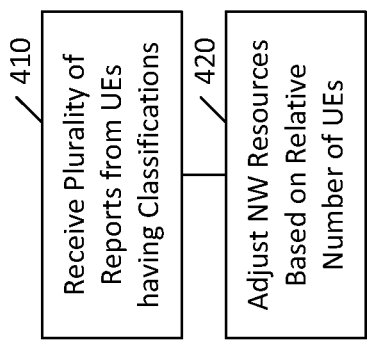
FIG. 4 illustrates another method according to certain embodiments.

FIG. 4 illustrates another method according to certain embodiments. As shown in FIG. 4, a method can include, at 410, receiving, at a network element, a plurality of reports from user equipment, wherein the reports indicate a relative number of three user types. The three types can be that the user equipment operates at a minimum level regardless of a mean probability of transmission probabilities of a plurality of user equipment, that the user equipment adjusts transmission to the mean probability, and that the user equipment operates at a maximum level regardless the mean probability. The method can also include, at 420, adjusting network resources based on the relative number.

Certain embodiments may have various benefits or advantages. For example, certain embodiments may allow tuning of the total load optimally while taking different discovery needs of the UEs into account. Moreover, this can happen in a distributed way.

Figure 5:
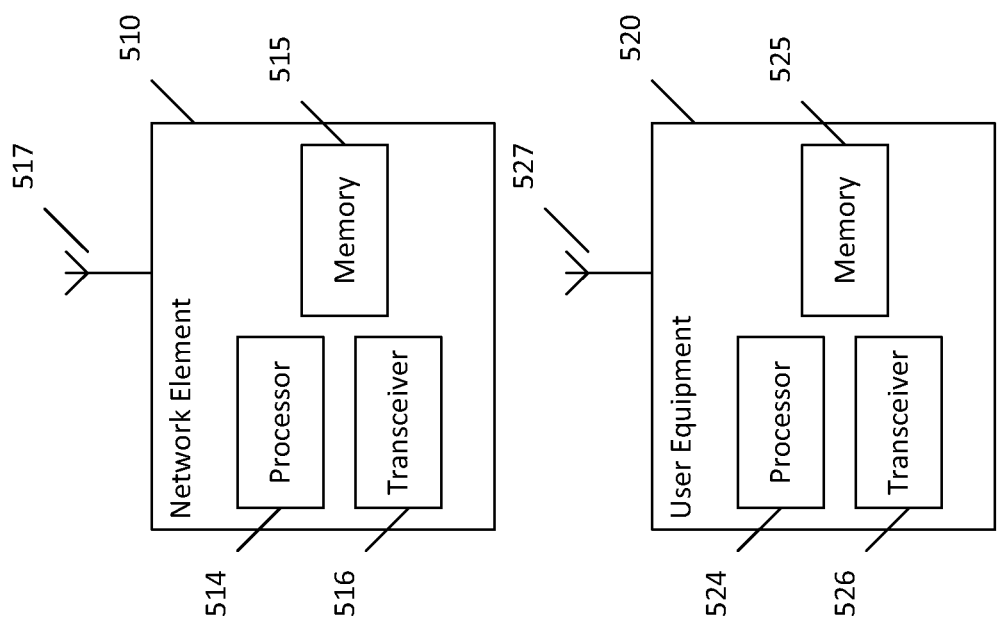
FIG. 5 illustrates a system according to certain embodiments.

FIG. 5 illustrates a system according to certain embodiments. It should be understood that each block of the flowchart of FIG. 3 or 4 and any combination thereof may be implemented by various means or their combinations, such as hardware, software, firmware, one or more processors and/or circuitry. In one embodiment, a system may include several devices, such as, for example, network element 510 and user equipment (UE) or user device 520. The system may include more than one UE 520 and more than one network element 510, although only one of each is shown for the purposes of illustration. A network element can be an access point, a base station, an eNode B (eNB), server, host or any of the other network elements discussed herein. Each of these devices may include at least one processor or control unit or module, respectively indicated as 514 and 524. At least one memory may be provided in each device, and indicated as 515 and 525, respectively. The memory may include computer program instructions or computer code contained therein. One or more transceiver 516 and 526 may be provided, and each device may also include an antenna, respectively illustrated as 517 and 527. Although only one antenna each is shown, many antennas and multiple antenna elements may be provided to each of the devices. Other configurations of these devices, for example, may be provided. For example, network element 510 and UE 520 may be additionally configured for wired communication, in addition to wireless communication, and in such a case antennas 517 and 527 may illustrate any form of communication hardware, without being limited to merely an antenna. Likewise, some network elements 510 may be solely configured for wired communication, and in such cases antenna 517 may illustrate any form of wired communication hardware, such as a network interface card.

Transceivers 516 and 526 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network element deliver local content. One or more functionalities may also be implemented as virtual application(s) in software that can run on a server.

A user device or user equipment 520 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In an exemplary embodiment, an apparatus, such as a node or user device, may include means for carrying out embodiments described above in relation to FIG. 3 or 4.

Processors 514 and 524 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 510 and/or UE 520, to perform any of the processes described above (see, for example, FIGS. 3 and 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 5 illustrates a system including a network element 510 and a UE 520, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node. The UE 520 may likewise be provided with a variety of configurations for communication other than communication network element 510. For example, the UE 520 may be configured for device-to-device communication.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
   determining, by a user equipment, a first classification of the user equipment according to desired or allowed transmission probability;
   configuring, by the user equipment a transmission probability based on the first classification;
   operating the user equipment based on the transmission probability;
   changing the first classification; and
   adjusting, by the user equipment, the transmission probability based on the changed first classification and at least partially load,
   wherein the first classification is determined as at least one of that the user equipment operates at a minimum level regardless of a mean probability of transmission probabilities of a plurality of user equipments, that the user equipment adjusts transmission to the mean probability, or that the user equipment operates at a maximum level regardless the mean probability.

2. The method of claim 1, further comprising: indicating the first classification when reporting load.

3. The method of claim 1, wherein the transmission probability is determined by $P\_tx(k+1)=P\_tx(k)+C\_load*(optimal\_load-estimated\_load(k))+C\_p*(max(P\_privileged\_target,mean\_P\_tx(k)))-P\_tx(k))$ and $P\_tx(k+1)=P\_target$, if $P\_tx(k+1)>P\_target$, wherein $P\_tx(k)$ is the transmission probability for the kth time resource, $C\_load$ is a coefficient for adjusting $P\_tx$ according to the load, $C\_p$ is a coefficient for adjusting $P\_tx$ according to the mean observed $P\_tx$, optimal_load is the optimal load for the system, estimated_load is the user equipment's estimate on the load, P_privileged_target is larger than zero if the user equipment has been given a target $P\_tx$ value that the user equipment can maintain even if the target $P\_tx$ is larger than the mean broadcasted $P\_tx$ in the system, $mean\_P\_tx(k)$ is the mean of the $P\_tx$ values that are broadcasted by the other user equipments, and P_target is the transmission probability with which the user equipment is satisfied.

4. The method of claim 1, further comprising:
   broadcasting a transmission probability if the user equipment is set to adjust the transmission probability to the mean probability.

5. The method of claim 1, further comprising:
   receiving a transmission probability of at least one other user equipment; and
   determining whether to take the transmission probability into account when determining a mean transmission probability, based on a classification of the at least one other user equipment.

6. The method of claim 1, further comprising:
   determining a mean of transmission probabilities of a plurality of user equipment; and
   determining whether to adjust the transmission probability based on the mean, based in part on the first classification.

7. An apparatus, comprising:
   at least one processor; and
   at least one memory including computer program code,
   wherein the at least one memory and the computer program code are configured to, with the at least one processor, cause the apparatus at least to determine a first classification of the apparatus according to desired or allowed transmission probability;
configure a transmission probability based on the first classification;
operate based on the transmission probability;
change the first classification; and
adjust the transmission probability based on the changed first classification and at least partially load,
wherein the first classification is determined as at least one of that the at least one memory and the computer program code are configured to, with the at least one processor, cause the apparatus at least to operate at a minimum level regardless of a mean probability of transmission probabilities of a plurality of user equipments, adjust transmission to the mean probability, or operate at a maximum level regardless the mean probability.

8. The apparatus of claim 7, wherein the at least one memory and the computer program code are configured to, with the at least one processor, cause the apparatus at least to
determine a mean of transmission probabilities of a plurality of user equipments; and
determine whether to adjust the transmission probability based on the mean, based in part on the first classification.

9. The apparatus of claim 7, wherein the at least one memory and the computer program code are configured to, with the at least one processor, cause the apparatus at least to indicate the first classification when reporting load.

10. The apparatus of claim 7, wherein the transmission probability is determined by P_tx(k+1)=P_tx(k)+C_load*(optimal_load−estimated_load(k))+C_p*(max(P_privileged_target, mean_P_tx(k)))−P_tx(k))

and

P_tx(k+1)=P_target, if P_tx(k+1)>P_target, wherein P_tx(k) is the transmission probability for the kth time resource, C_load is a coefficient for adjusting P_tx according to the load, C_p is a coefficient for adjusting P_tx according to the mean observed P_tx, optimal_load is the optimal load for the system, estimated_load is the user apparatus' estimate on the load, P_privileged_target is larger than zero if the apparatus has been given a target P_tx value that the apparatus can maintain even if the target P_tx is larger than the mean broadcasted P_tx in the system, mean_P_tx(k) is the mean of the P_tx values that are broadcasted by the other user equipments, and P_target is the transmission probability with which the apparatus is satisfied.

11. The apparatus of claim 7, wherein the at least one memory and the computer program code are configured to, with the at least one processor, cause the apparatus at least to broadcast a transmission probability if the apparatus is set to adjust the transmission probability to the mean probability.

12. The apparatus of claim 7, wherein the at least one memory and the computer program code are configured to, with the at least one processor, cause the apparatus at least to
receive a transmission probability of at least one other user equipment; and
determine whether to take the transmission probability into account when determining a mean transmission probability, based on a classification of the at least one other user equipment.

13. The apparatus of claim 7, wherein the at least one memory and the computer program code are configured to, with the at least one processor, cause the apparatus at least to
determine a mean of transmission probabilities of a plurality of user equipment; and
determine whether to adjust the transmission probability based on the mean, based in part on the first classification.

14. A non-transitory computer-readable medium encoded with instructions that, when executed in hardware, perform a process, the process comprising:
determining, at a user equipment, a first classification of the user equipment according to desired or allowed transmission probability;
configuring, at the user equipment, a transmission probability based on the first classification;
operating the user equipment based on the transmission probability;
changing the first classification; and
adjusting, at the user equipment, the transmission probability based on the changed first classification and at least partially load,
wherein the first classification is determined as at least one of that the user equipment operates at a minimum level regardless of a mean probability of transmission probabilities of a plurality of user equipments, that the user equipment adjusts transmission to the mean probability, or that the user equipment operates at a maximum level regardless the mean probability.

15. A computer program embodied on a non-transitory computer readable medium, the computer program, when executed by a processor, causes the processor to:
determine, at a user equipment, a first classification of the user equipment according to desired or allowed transmission probability;
configure, at the user equipment, a transmission probability based on the first classification;
operate the user equipment based on the transmission probability;
change the first classification; and
adjust, at the user equipment, the transmission probability based on the changed first classification and at least partially load,
wherein the first classification is determined as at least one of that the user equipment operates at a minimum level regardless of a mean probability of transmission probabilities of a plurality of user equipments, that the user equipment adjusts transmission to the mean probability, or that the user equipment operates at a maximum level regardless the mean probability.

* * * * *